United States Patent [19]
Fujita et al.

[11] Patent Number: 5,296,582
[45] Date of Patent: Mar. 22, 1994

[54] CURABLE RESIN COMPOSITION

[75] Inventors: Masayuki Fujita; Michihide Homma; Hiroshi Wakabayashi, all of Hyogo, Japan

[73] Assignee: Kanegafuchi Chemical Industry Co., Ltd., Osaka, Japan

[21] Appl. No.: 776,427

[22] Filed: Nov. 18, 1991

[30] Foreign Application Priority Data

Apr. 3, 1990 [JP] Japan ................................. 2-89713

[51] Int. Cl.$^5$ ............................................. C08G 77/04
[52] U.S. Cl. ....................................... 528/27; 528/87; 525/476
[58] Field of Search .......................... 528/27; 525/476

[56] References Cited

U.S. PATENT DOCUMENTS

| | | | |
|---|---|---|---|
| 5,011,900 | 4/1991 | Yukimoto et al. | 525/476 |
| 5,063,270 | 11/1991 | Yukimoto et al. | 525/476 |

FOREIGN PATENT DOCUMENTS

| | | | |
|---|---|---|---|
| 46-27250 | 8/1971 | Japan. | |
| 59-15336 | 4/1984 | Japan. | |
| 61-197631 | 9/1986 | Japan. | |
| 61-215622 | 9/1986 | Japan. | |
| 61-215623 | 9/1986 | Japan. | |
| 61-218632 | 9/1986 | Japan. | |
| 61-247723 | 11/1986 | Japan | 528/21 |
| 61-268720 | 11/1986 | Japan. | |

Primary Examiner—John Kight, III
Assistant Examiner—Richard Jones
Attorney, Agent, or Firm—Jordan and Hamburg

[57] ABSTRACT

A curable resin composition has a low viscosity, hence is easy to handle, before curing and, after curing, gives cured products having good tensile characteristics and, in addition, good chemical resistance and water resistance. This composition includes (A) an oxypropylene polymer having at least one silicon atom-containing group having a hydroxyl group or hydrolyzable group bound to the silicon atom and having an Mw/Mn ratio of up to than 1.6 and a number average molecular weight of at least 6,000, and (B) an epoxy resin.

4 Claims, No Drawings

CURABLE RESIN COMPOSITION

This invention relates to a novel curable resin composition comprising a reactive silicon group-containing oxypropylene polymer and an epoxy resin.

BACKGROUND OF THE INVENTION

So far, epoxy resins have been used widely in such fields as various molding materials, adhesives, paints, plywoods and laminates. However, there are problems common to these applications; disadvantageously, cured products are brittle or fragile and, when epoxy resins are used in adhesives, the peel strength is low.

Meanwhile, oxypropylene polymers having a reactive silicon group (a group which is a silicon atom-containing group with a hydroxyl group or a hydrolyzable group being bound to the silicon atom and can form a siloxane bond) have interesting characteristics in that they can be cured at ambient temperature to give rubber-like elastic substances. Generally, however, they are disadvantageous in that the strength of cured products is low, so that their applications are restricted.

For markedly improving the disadvantageous properties of both, namely the brittleness of cured epoxy resins and the insufficient strength of cured oxypropylene polymers, curable resin compositions in which an epoxy resins and a reactive silicon group-containing oxypropylene polymer are combined have been proposed (e.g. Japanese Kokai Patent Publication No. 61-247723 and No. 61-268720).

However, it has so far been difficult to produce oxypropylene polymers having a high molecular weight with a narrow molecular weight distribution (high monodispersity) and accordingly only reactive silicon group-containing oxypropylene polymers having a broad molecular weight distribution (high polydispersity) have been known.

Compositions in which such oxypropylene polymers have a broad molecular weight distribution cause various inconveniences in practical use thereof; for instance, they have a high viscosity and are not easy to handle before curing.

Recently, it has been reported that polyoxypropylenes showing a narrow molecular weight distribution can be produced. See Japanese Kokai Patent Publications Nos. 61-197631, 61-215622, 61-215623 and 61-218632 and Japanese Patent Publications Nos. 46-27250 and 59-15336. The present inventors found that compositions comprising an epoxy resin and a polymer derived from an oxypropylene polymer with a narrow molecular weight distribution, which is used as the main chain, by introducing a reactive silicon group at the terminal of said chain have a low viscosity and are easy to handle before curing and, after curing, give cured products having excellent tensile characteristics and furthermore good chemical resistance and water resistance. This finding has now led to completion of the present invention

SUMMARY OF THE INVENTION

The curable resin composition of the invention comprises
A) an oxypropylene polymer which contains, in its main polymer chain, a repeating unit of the formula

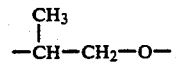

and which has at least one silicon atom-containing group (reactive silicon group) with a hydroxyl group or a hydrolyzable group bound to the silicon atom and has an Mw/Mn (weight average molecular weight/number average molecular weight) ratio of not more than 1.6 and a number average molecular weight (Mn) of not less than 6,000, and
(B) an epoxy resin.

DESCRIPTION OF THE PREFERRED EMBODIMENTS

The reactive silicon group contained in the oxypropylene polymer, namely component (A), to be used in the practice of the invention is not limited to any particular species but may typically include, for example, groups of the following general formula (1)

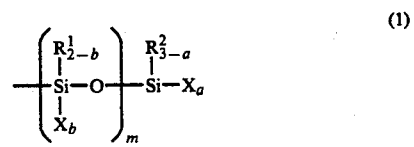

In the above formula, $R^1$ and $R^2$ each is an alkyl group containing 1 to 20 carbon atoms, an aryl group containing 6 to 20 carbon atoms, an aralkyl group containing 7 to 20 carbon atoms or a triorganosiloxy group of the formula $(R')_3SiO-$. Where there are two or more $R^1$ or $R^2$ groups, they may be the same or different. $R'$ is a monovalent hydrocarbon group containing 1 to 20 carbon atoms. The three $R'$ groups may be the same or different. X is a hydroxyl group or a hydrolyzable group and, where there are two or more X groups, they may be the same or different a is 0, 1, 2 or 3 and b is 0, 1 or 2. The number b may vary in the m groups of the formula

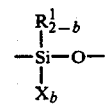

m is an integer of 0 to 19. The following condition shall be satisfied: $a + \Sigma b \geq 1$.

The hydrolyzable group represented by the above-mentioned X is not particularly limited but may be any hydrolyzable group known in the art. More specifically, there may be mentioned a hydrogen atom, a halogen atom, an alkoxy group, an acyloxy group, a ketoximato group, an amino group, an amido group, an acid amido group, an aminoxy group, a mercapto group, an alkenyloxy group and the like. Among these, the hydrogen atom and alkoxy, acyloxy, ketoximato, amino, amido, aminoxy, mercapto and alkenyloxy groups are preferred. From the viewpoint of mild hydrolyzability and easy handling, alkoxy groups, for example methoxy, are particularly preferred.

One to three such hydrolyzable groups or hydroxyl groups may be bound to one silicon atom, and $(a + \Sigma b)$ is preferably equal to 1 to 5. Where there are two or more hydrolyzable groups or hydroxyl groups in the reactive silicon group, they may be the same or different.

The reactive silicon group may contain one silicon atom or two or more silicon atoms. In the case of a reactive silicon group comprising silicon atoms linked to one another via a siloxane bonding or the like, such a group may contain about 20 silicon atoms.

Reactive silicon groups of the following general formula (2) are preferred because of ready availability.

In the above formula, $R^2$, X and a are as defined above.

Specific examples of $R^1$ and $R^2$ appearing in the general formula (1) given hereinabove include, among others, alkyl groups, such as methyl and ethyl, cycloalkyl groups, such as cyclohexyl, aryl groups, such as phenyl, aralkyl groups, such as benzyl, and triorganosiloxy groups of the formula $(R')_3SiO-$ in which R' is methyl or phenyl. The methyl group is particularly preferred as $R^1$, $R^2$ and/or R'.

The oxypropylene polymer should recommendably contain at least one, preferably 1.1 to 5 reactive silicon groups per molecule thereof. When the number of reactive silicon groups contained in the polymer on a per-molecule basis is less than 1, the curability becomes inadequate and a good rubber elastic behavior can hardly be developed.

The reactive silicon group may be positioned terminally or internally to the molecular chain of the oxypropylene polymer. When the reactive silicon group occurs terminally to the molecular chain, the oxypropylene polymer component contained in the finally formed cured product can have an increased number of effective network chains and therefore a rubber-like cured product showing high strength, high elongation and low elasticity can readily be obtained.

The oxypropylene polymer, which constitutes the main polymer chain in the component (A) to be used in the practice of the invention, contains a repeating unit of the formula

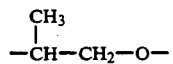

This oxypropylene polymer may be straight-chained or branched, or a mixture of these. It may further contain another monomer unit or the like. It is preferable, however, that the polymer contains the monomer unit represented by the above formula in an amount of at least 50% by weight, more preferably at least 80% by weight.

The oxypropylene polymer that can effectively be used has a number average molecular weight (Mn) of not less than 6,000, preferably 6,000 to 30,000. Furthermore, in this oxypropylene polymer, the weight average molecular weight/number average molecular weight ratio (Mw/Mn) is not more than 1.6, hence the molecular weight distribution is very narrow (the polymer is highly monodisperse). The value of Mw/Mn should preferably be not higher than 1.5, more preferably not higher than 1.4. The molecular weight distribution can be measured by various methods. Generally, however, the measurement method most commonly used is gel permeation chromatography (GPC). Since the molecular weight distribution is narrow in that manner despite the great number average molecular weight, the composition of the invention has a low viscosity before curing, hence is easy to handle and, after curing, shows a good rubber-like elastic behavior and when used as an adhesive, produces an excellent adhesive strength.

The reactive silicon group-containing oxypropylene polymer to be used as component (A) in the practice of the invention is preferably prepared by introducing a reactive silicon group into an oxypropylene polymer having a functional group.

Oxypropylene polymers having a high molecular weight with a narrow molecular weight distribution and having a functional group can hardly be obtained by the conventional method of polymerizing oxypropylene (anionic polymerization using a caustic alkali) or by the chain extension reaction method using oxypropylene polymers obtained by said conventional method as starting materials. They can be obtained, however, by such special polymerization methods as those described in Japanese Kokai Patent Publications Nos. 61-197631, 61-215622, 61-215623 and 61-218632 and Japanese Patent Publications Nos. 46-27250 and 59-15336 and elsewhere. Since introduction of a reactive silicon group tends to result in a broadened molecular weight distribution as compared with that before introduction, the molecular weight distribution of the polymer before introduction should preferably be as narrow as possible.

The reactive silicon group introduction can be carried out by any appropriate known method. Thus, for example, the following methods may be mentioned. (1) An oxypropylene polymer having a terminal functional group, for example a hydroxyl group, is reacted with an organic compound having an active group or unsaturated group reactive with said functional group and then the resulting reaction product is hydrosilylated by treatment with a hydrosilane having a hydrolyzable group.

(2) An oxypropylene polymer having a terminal functional group (hereinafter referred to as functional group Y), such as a hydroxyl, epoxy or isocyanato group, is reacted with a compound having a functional group (hereinafter referred to as functional group Y') reactive with said functional group Y and a reactive silicon group.

Typical examples of the silicon compound having the functional group Y' include, but are not limited to, amino group-containing silanes, such as γ-(2-aminoethyl)aminopropyltrimethoxysilane, γ-(2-aminoethyl)aminopropylmethyldimethoxysilane and γ-aminopropyltriethoxysilane; mercapto group-containing silanes, such as γ-mercaptopropyltrimethoxysilane and γ-mercaptopropylmethyldimethoxysilane; epoxysilanes, such as γ-glycidoxypropyltrimethoxysilane and β-(3,4-epoxy cyclohexyl)ethyltrimethoxysilane; vinyl type unsaturated group-containing silanes, such as vinyltriethoxysilane, γ-methacryloyloxypropyltrimethoxysilane and γ-acryloyloxypropylmethyldimethoxysilane; chlorine atom-containing silanes, such as γ-chloropropyltrimethoxysilane; isocyanato-containing silanes, such as γ-isocyanatopropyltriethoxysilane and γ-isocyanatopropylmethyldimethoxysilane; and hydrosilanes, such as methyldimethoxysilane, trimethoxysilane and methyldiethoxysilane.

Among the methods mentioned above, the method (1), and the method (2) comprising the reaction between a polymer having a terminal hydroxyl group and a compound having an isocyanato group and a reactive silicon group, are preferred.

As examples of the epoxy resin which is to be used as component (B) in the practice of the invention, there may be mentioned epichlorohydrin-bisphenol A type epoxy resins, epichlorohydrin-bis-phenol F type epoxy resins, tetrabromobisphenol A glycidyl ether and like flame-resistant epoxy resins, novolak type epoxy resins, hydrogenated bisphenol A type epoxy resins, bisphenol A-propylene oxide adduct glycidyl ether type epoxy resins, p-hydroxybenzoic acid glycidyl ether ester type epoxy resins, m-aminophenol-based epoxy resins, diaminodiphenylmethane-based epoxy resins, urethane-modified epoxy resins, various alicyclic epoxy resins, N,N-diglycidylaniline, N,N-diglycidyl-o-toluidine, triglycidyl isocyanurate, polyalkylene glycol diglycidyl ether, other glycidyl ethers with a polyhydric alcohol such as glycerol, hydantoin type epoxy resins, and epoxidation products from unsaturated polymers such as petroleum resin. These are not limitative examples but those epoxy resins that are in general use can be used. Among these epoxy resins, those that have, in their molecule, at least two epoxy groups of the formula

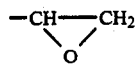

are preferred since they are highly reactive in curing and cured products therefrom can readily form a three-dimensional network. As more preferred ones, there may be mentioned bisphenol A type epoxy resins and novolak type epoxy resins.

In the practice of the invention, it is of course possible to use a curing agent for curing the epoxy resin. Usable epoxy resin curing agents are those epoxy curing agents that are commonly used. Such curing agents include, but are not limited to, amines, such as triethylenetetramine, tetraethylenepentamine, diethylaminopropylamine, N-aminoethylpiperazine, m-xylylenediamine, m-phenylenediamine, diaminodiphenylmethane, diaminodiphenyl sulfone, isophoronediamine and 2,4,6-tris(-dimethylaminomethyl)phenol; tertiary amine salts; polyamide resins; imidazoles; dicyandiamides; ketimines; boron trifluoride complexes; carboxylic acid anhydrides, such as phthalic anhydride, hexahydrophthalic anhydride, tetrahydrophthalic anhydride, endomethylenetetrahydrophthalic anhydride, dodecylsuccinic anhydride, pyromellitic anhydride and chlorendic anhydride; alcohols; phenols; carboxylic acids; and the like compounds.

When the curing agent mentioned above is used, its amount to be employed may vary depending on the kind of epoxy resin and the kind of curing agent. Recommendably, the curing agent should be used in an amount within the range of 0.1 to 300 parts (parts by weight; hereinafter the same shall apply) per 100 parts of component (B).

In the composition of the invention, it is preferable, for improving the strength of cured products, to use, as component (C), a silicone compound containing a functional group capable of reacting with the epoxy group and a reactive silicon group within its molecule.

The functional group contained in such silicon compound and capable of reacting with the epoxy group more specifically includes, among others, primary, secondary and tertiary amino groups; mercapto group; epoxy group; and carboxyl group. As the reactive silicon group, there may be mentioned the same reactive silicon groups that have been mentioned in the description of the afore-mentioned component (A). From the easy handling and other viewpoints, alkoxysilyl groups are preferred, however As typical examples of such silicon compound, there may be mentioned amino-containing silanes, such as γ-aminopropyltrimethoxysilane, γ-aminopropyltriethoxysilane, γ-aminopropylmethyldi-methoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-ureidopropyl-triethoxysilane, N-β-(N-vinylbenzylaminoethyl)-γ-aminopropyltrimethoxysilane and γ-anilinopropyltrimethoxysilane; mercapto-containing silanes, such as γ-mercaptopropyltrimethoxysilane, γ-mercaptopropyltriethoxysilane, γ-mercaptopropylmethyldimethoxysilane and γ-mercaptopropylmethyldiethoxysilane; epoxy bondcontaining silanes, such as γ-glycidoxypropyltrimethoxysilane, γ-glycidoxypropylmethyldimethoxysilane, γ-glycidoxypropyltriethoxysilane and β-(3,4-epoxycyclohexyl) ethyltrimethoxysilane; and carboxysilanes, such as β-carboxyethyltriethoxysilane, β-carboxyethylphenylbis(2-methoxyethoxy)silane and N-β-(N-carboxymethylaminoethyl )-γ-aminopropyltrimethoxysilane. These silicon compounds may be used either singly or in combination in the form of a mixture of two or more of them.

The ratio between component (A) and component (B) to be used in the composition of the invention is (A)/(B)=100/1 to 1/100 by weight. When the ratio (A)/(B) is below 1/100, the impact strength and toughness of cured epoxy resin products can hardly be improved effectively. When the ratio (A)/(B) exceeds 100/1, the strength of cured oxypropylene polymers becomes insufficient. The preferred ratio between component (A) and component (B) may vary depending on the use of the curable resin composition and other factors and therefore cannot be specified without reserve. For instance, for improving the impact resistance, flexibility, toughness, peel strength and other characteristics of cured epoxy resins, the component (A) should recommendably be used in an amount of 1 to 100 parts, preferably 5 to 100 parts, per 100 parts of component (B). For improving the strength of cured products from a reactive silicon group-containing oxypropylene polymer, which is the component (A), it is recommendable that the component (B) be used in an amount of 1 to 200 parts, preferably 5 to 100 parts, per 100 parts of component (A).

The above-mentioned silicon compound (component (C)), is used preferably in an amount such that the weight ratio relative to components (A) and (B) falls within the range of ((A)+(B))/(C)=100/0.1 to 100/20, more preferably ((A)+(B))/(C)=100/0.2 to 100/10.

The method of preparing the curable composition of the invention is not particularly limited but any conventional method can be employed for example, the components mentioned above are combined and kneaded up in a mixer, roll or kneader at ambient temperature or under heating, or the components are dissolved in a small amount of an appropriate solvent for attaining admixing. Furthermore, it is also possible to prepare one-can or two-can formulas by appropriately combining the components.

The curable resin composition of the invention may contain a silanol condensing catalyst (curing catalyst).

When a silanol condensing catalyst is used, it may be selected from a wide variety of known ones. As typical examples thereof, there may be mentioned such silanol condensing catalysts as titanate esters, such as tetrabutyl titanate and tetrapropyl titanate; tin carboxylate salts, such as dibutyltin dilaurate, dibutyltin maleate, dibutyltin diacetate, tin octanoate and tin naphthenate; reaction products from dibutyltin oxide and phthalate esters; dibutyltin diacetylacetonate; organic aluminum compounds, such as aluminum trisacetyl-acetonate, aluminum tris(ethyl acetoacetate) and diisopropoxyaluminum ethyl acetoacetate; chelate compounds such as zirconium tetracetylacetonate and titanium tetracetylacetonate; lead octanoate; amine compounds, such as butylamine, octylamine dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole and 1,8-diazabicyclo[5.4.0]undecene-7 (DBU), and salts of such amine compounds with carboxylic acids and so forth; low molecular weight polyamide resins obtained from an excess of a polyamine and a polybasic acid; reaction products from an excess of a polyamine and an epoxy compound; amino-containing silane coupling agents, such as γ-aminopropyltrimethoxysilane and N-(β-aminoethyl)aminopropylmethyldimethoxysilane; and other known silanol condensing catalysts, such as acid catalysts and basic catalysts. These catalysts may be used either singly or in combination in the form of a mixture of two or more of them.

These silanol condensing catalysts are used preferably in an amount of about 0.1 to 20 parts, more preferably about 1 to 10 parts, per 100 parts of the oxypropylene polymer When the amount of the silanol condensing catalyst is too small as compared with the oxypropylene polymer, the rate of reaction may be slow in certain instances and the curing reaction can hardly proceed to a satisfactory extent in some instances. On the other hand, if the amount of the silanol condensing catalyst is too large relative to the oxypropylene polymer, local heat generation and/or foaming may occur during curing, unfavorably making it difficult to obtain good cured products.

The curable resin composition of the invention may be modified by incorporating thereinto various fillers. Usable as the fillers are reinforcing fillers such as fumed silica, precipitated silica, silicic anhydride, hydrous silicic acid and carbon black; fillers such as calcium carbonate, magnesium carbonate, diatomaceous earth, calcined clay, clay, talc, titanium oxide, bentonite, organic bentonite, ferric oxide, zinc oxide, active zinc white, and "shirasu" balloons; and fibrous fillers such as asbestos, glass fibers and filaments.

For obtaining cured compositions affording high strength using such fillers, a filler selected from among fumed silica, precipitated silica, anhydrous silicic acid, hydrous silicic acid, carbon black, surface-treated finely divided calcium carbonate, calcined clay, clay, active zinc white and the like is used in the main in an amount within the range of 1 to 100 parts per 100 parts of the reactive silicon group-containing oxypropylene polymer to give favorable results. For obtaining cured compositions affording low strength and high elongation, a filler selected from among titanium oxide, calcium carbonate, magnesium carbonate, talc, ferric oxide, zinc oxide, "shirasu" balloons and the like is used in the main in an amount within the range of 5 to 200 parts per 100 parts of the reactive silicon group-containing oxypropylene polymer to give favorable results. Of course, these fillers may be used either alone or in combination as a mixture of two or more of them.

In using the reactive silicon group-containing oxypropylene polymer in accordance with the invention, a plasticizer may be used more effectively in combination with the filler since the use thereof may provide the cured products with an increased elongation and/or allow incorporation of fillers in large amounts. This plasticizer is any one in common and general use. Thus, for instance, phthalate esters, such as dioctyl phthalate, dibutyl phthalate and butyl benzyl phthalate; aliphatic dibasic acid esters, such as dioctyl adipate, isodecyl succinate and dibutyl sebacate; glycol esters, such as diethylene glycol dibenzoate and pentaerythritol esters; aliphatic esters, such as butyl oleate and methyl acetylricinoleate; phosphate esters, such as tricresyl phosphate, trioctyl phosphate and octyl diphenyl phosphate; epoxy plasticizers, such as epoxidized soybean oil, and benzyl epoxystearate; polyester plasticizers, such as polyesters from a dibasic acid and a dihydric alcohol; polyethers, such as polypropylene glycol and derivatives thereof; polystyrenes, such as poly-α-methylstyrene and polystyrene; polybutadiene, butadiene-acrylonitrile copolymer, polychloroprene, polyisoprene, polybutene, chlorinated paraffin, and so forth may be used either singly or in combination in the form of a mixture of two or more of them, as desired. Favorable results are obtained when the plasticizer is used in an amount within the range of 0 to 100 parts per 100 parts of the reactive silicon group-containing oxypropylene polymer.

In using the curable resin composition of the invention, various additives, such as adhesion improvers, physical property modifiers, storage stability improvers, antioxidants, ultraviolet absorbers, metal inactivators, antiozonants, light stabilizers, amine type radical chain inhibitors, phosphorus-containing peroxide decomposing agents, lubricants, pigments, blowing agents, etc., may be added to the composition as necessary, each in an appropriate amount.

The curable composition of the invention is curable at a temperature as low as room temperature It is also possible to cause rapid curing at a high temperature of about 100 to 150° C. Therefore, the composition can be subjected to curing within a wide temperature range from such low temperature to such high temperature depending on the purpose. Particularly when an epoxy resin/epoxy resin curing agent combination capable of curing at room temperature is selected, the curable composition of the invention will produce an interesting feature in that said composition gives high-strength cured products after room temperature curing. Furthermore, when a liquid type epoxy resin is used, another feature will be produced in that solvent-free curable compositions can readily be prepared.

The method of molding the curable resin composition of the invention is not critical. However, when the amount of the epoxy resin is greater than that of the reactive silicon group-containing oxypropylene polymer, those methods that are generally used for epoxy resin molding, for example compression molding, transfer molding and injection molding, are preferred and, when molded by such methods, the composition gives moldings, copper-clad laminates, reinforced wood products and other laminated moldings improved in impact resistance, flexibility, toughness and so on. In addition, when it is formulated as mentioned above, the composition may also be suitably used as an adhesive improved in peel strength, a foaming material improved in flexibility, a binder for fiber boards and particle boards, a paint, a binder for shell molds, a binder for brake linings, a binder for abrasives, a composite material prepared by combining with glass fiber or carbon fiber, and so on.

On the other hand, when the amount of the reactive silicon group-containing oxypropylene polymer is greater than that of the epoxy resin, those molding methods that are generally used in molding solid rubbers such as natural rubber or in molding rubberlike liquid polymers such as polyurethanes are preferred and these molding methods give shaped rubber articles, rubber-like foamed products and so on, improved in strength, etc. When the amount of the reactive silicon group-containing oxypropylene polymer is greater than that of the epoxy resin, the composition may also be suitably used as a rubber-type adhesive, a sealant, a sticking agent, or the like.

For further illustrating the invention, the following examples are given.

SYNTHESIS EXAMPLE 1

A flask equipped with a stirrer was charged with 220 g (0.0447 equivalent) of polyoxypropylene triol having a number average molecular weight of 15,000 (Mw/Mn=1.38, viscosity=89 poises) and 0.02 g of dibutyltin dilaurate and, in a nitrogen atmosphere, 8.45 g (0.0447 equivalent) of γ-isocyanatopropylmethyldimethoxysilane was added dropwise at room temperature. After completion of the dropping, the reaction was conducted at 75° C. for 1.5 hours. IR spectrum measurement was performed and, after confirmation of the disappearance of the NCO absorption at about 2280 cm$^{-1}$ and of the formation of a C=O absorption at about 1730 cm$^{-1}$, the reaction was discontinued. A colorless and transparent polymer (213 g) was obtained.

SYNTHESIS EXAMPLE 2

A 1.5-liter pressure-resistant glass reaction vessel was charged with 401 g (0.081 equivalent) of polyoxypropylene triol having a molecular weight of 15,000 (Mw/Mn=1.38, viscosity=89 poises) and the contents were placed in a nitrogen atmosphere.

At 137° C., 19.1 g (0.099 equivalent) of a 28% solution of sodium methoxide in methanol was added dropwise from a dropping funnel, then the reaction was conducted for 5 hours and thereafter the reaction mixture was placed under reduced pressure for volatile matter removal. Again in a nitrogen atmosphere, 9.0 g (0.118 equivalent) of allyl chloride was added dropwise, the reaction was conducted for 1.5 hours and then the allylation was further carried out using 5.6 g (0.029 equivalent) of a 28% solution of sodium methoxide in methanol and 2.7 g (0.035 equivalent) of allyl chloride.

The reaction product was dissolved in hexane and subjected to adsorption treatment with aluminum silicate. The subsequent removal of the hexane under reduced pressure gave 311 g of a yellow and transparent polymer (viscosity =68 poises).

A pressure-resistant glass reaction vessel was charged with 270 g (0.065 equivalent) of this polymer and the contents were placed in a nitrogen atmosphere. A chloroplatinic acid catalyst solution (prepared by dissolving 25 g of H$_2$PtCl$_6$·H$_2$O in 500 g of isopropyl alcohol; 0.075 ml) was added and the mixture was stirred for 30 minutes. Dimethoxymethylsilane (6.24 g, 0.059 equivalent) was added from a dropping funnel and the reaction was conducted at 90° C. for 4 hours. The subsequent volatile matter removal gave 260 g of a yellow and transparent polymer.

COMPARATIVE SYNTHESIS EXAMPLE 1

A pressure-resistant reaction vessel equipped with a stirrer was charged with 800 g of polypropylene oxide having a number average molecular weight of 8,000 as obtained by subjecting 90 parts of polypropylene glycol (number average molecular weight=2,500) and 10 parts of polypropylene triol (number average molecular weight =3,000) (starting materials) to molecular weight jumping reaction using methylene chloride and then capping the molecular chain terminals with allyl chloride to thereby introduce allyl ether groups into 99% of all terminals. Then, 20 g of methyldimethoxysilane was added to the vessel. After further addition of 0.40 ml of a chloroplatinic acid catalyst solution (prepared by dissolving 8.9 g of H$_2$PtCl$_6$·6H$_2$O in 18 ml of isopropyl alcohol and 160 ml of tetrahydrofuran), the reaction was conducted at 80° C. for 6 hours.

The silicon hydride group remaining in the reaction mixture was assayed by IR spectrometry and found to be little. As a result of silicon group assay by the NMR method, the product was found to be polypropylene oxide containing, terminally to the molecule thereof, about 1.75 groups of the formula

per molecule.

The viscosity of each of the polymers obtained in Synthesis Examples 1 and 2 and Comparative Synthesis Example 1 was determined at 23° C. using a type B viscometer (BM type rotar No. 4, 12 rpm). Each polymer was also analyzed for number average molecular weight (Mn) and molecular weight distribution (Mw/Mn) by GPC. The GPC was performed at an oven temperature of 40° C. using a column packed with a polystyrene gel (Tosoh Corporation) and tetrahydrofuran as the eluent. The results are shown in Table 1.

TABLE 1

| Polymer | Viscosity (poises) | Number average molecular weight (Mn) | Molecular weight distribution (Mw/Mn) |
|---|---|---|---|
| Synthesis Example 1 | 150 | 1.7 × 10$^4$ | 1.4 |
| Synthesis Example 2 | 88 | 1.8 × 10$^4$ | 1.5 |
| Comparative Synthesis Example 1 | 240 | 1.5 × 10$^4$ | 2.3 |

EXAMPLES 1 AND 2 AND COMPARATIVE EXAMPLE 1

One hundred (100) parts of each of the polymers obtained in Synthesis Examples 1 and 2 and Comparative Synthesis Example 1 was thoroughly kneaded with 50 parts of Epikote 828 (bisphenol A type epoxy resin produced by Yuka Shell Epoxy), 1 part of Nocrac SP (monophenolic antioxidant produced by Ouchi Shinko Kagaku Kogyo), 5 parts of 2,4,6-tris(dimethylaminomethyl)phenol (DMP-30), 1 part of N-β-(aminoethyl)-γ-aminopropyltrimethoxysilane, 1 part of #918 (organotin compound produced by Sankyo Yuki Gosei) and 0.4parts of water. Among the compositions thus obtained, the compositions of Examples 1 and 2 (in which the polymers of Synthesis Examples 1 and 2 were used, respectively) were lower in viscosity and easier to handle than the composition of Comparative Example 1 (in which the polymer of Comparative Synthesis Example 1 was used).

The compositions obtained were evaluated as adhesives in the following manner.

For tensile shear strength measurement, test samples were prepared according to JIS K 6850 using JIS H 4000 aluminum plates A-1050P (test pieces 100×25×2 mm in size) and sticking two plates together with each composition applied with a spatula, under manual pressure.

For T-peel bonding strength evaluation, a T peel test was performed according to JIS K 6854. JIS H 4000 aluminum plates A-1050P (test pieces 200×25×0.1 mm in size) were used. Each composition mentioned above was applied to a thickness of about 0.5 mm and, after contacting, pressure was applied five times using a 5 kg hand roller and avoiding going and returning in the lengthwise direction.

These adhesion test samples were cured at 23° C. for 2 days and further at 50° C. for 3 days and then subjected to tensile testing. The rate of pulling was adjusted to 50 mm/min for tensile shear testing and 200 mm/min for T peel testing. The results are shown in Table 2.

TABLE 2

| | Example 1 | Example 2 | Comparative Example 1 |
|---|---|---|---|
| Polymer used | Synthesis Example 1 | Synthesis Example 2 | Comparative Synthesis Example 1 |
| Tensile shear strength (kg/cm$^2$) | 78 | 76 | 78 |
| T-peel strength (kg/25 mm) | 12 | 12 | 13 |

EXAMPLES 3 AND 4 AND COMPARATIVE EXAMPLE 2

The compositions prepared in Examples 1 and 2 and Comparative Example 1 were each spread to give a sheet having a thickness of 2 mm and cured at 23° C. for 2 days and further at 50° C. for 3 days. Small pieces (1 cm×1 cm) were cut out from these sheet-like cured products, weighed, then immersed in 10 ml of 10% aqueous acetic acid solution and stored at 50° C.

After 14 days, the cured product pieces were taken out and their surfaces were observed. The results are shown in Table 3. In the table, o means no change and x means surface dissolution.

TABLE 3

| | Polymer used | Surface condition of cured product piece |
|---|---|---|
| Example 3 | Synthesis Example 1 | o |
| Example 4 | Synthesis Example 2 | o |
| Comparative Example 2 | Comparative Synthesis Example 1 | x |

The surface of the pieces of Comparative Example 2 was sticky and had been dissolved. On the contrary, the pieces of Examples 3 and 4 showed little changes. Therefore, it was found that the acid resistance had been markedly improved by the present invention.

The reactive silicon group-containing oxypropylene polymer to be used as component (A) in the curable resin composition of the invention has a narrow molecular weight distribution despite its high number average molecular weight. Therefore, before curing, the composition of the invention is lower in viscosity and easier to handle than compositions containing the conventional reactive silicon group-containing oxypropylene polymers having the same molecular weight but showing a broader molecular weight distribution.

The low viscosity before curing as mentioned above not only improves the processability but also enables incorporation of a large amount of filler to give an excellent room temperature curable composition.

After curing, the crosslinking network becomes uniform and the cured products show good rubber-like elastic behaviors, for example improved elongation characteristics. Thus, when the composition of the invention is used as an adhesive, good bonding strengths are developed.

Furthermore, the chemical resistance, in particular acid resistance, is improved to an unexpectedly great extent. The solvent resistance and water resistance are also good.

As mentioned above, the curable resin composition of the invention is of very high practical value.

We claim:

1. A curable resin composition which comprises:
   (A) an oxypropylene polymer which contains, in its main polymer chain, a repeating unit of the formula

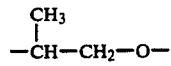

and which has at least one silicon atom-containing group having a hydroxyl group or a hydrolyzable group bound to the silicon atom and has an Mw/Mn ratio of up to 1.6 and a number average molecular weight of at least 6,000, and
   (B) an epoxy resin,
   a ratio of (A) to (B) being 100/1 to 1/100 by weight.

2. A curable resin composition as claimed in claim 1, wherein the component (A) polymer has an Mw/Mn ratio of up to 1.5.

3. A curable resin composition as claimed in claim 1 wherein the component (A) polymer has a number average molecular weight of 6,000 to 30,000.

4. A curable resin composition as claimed in claim 1, wherein the silicon atom-containing group occurs at the terminal of the molecular chain.

* * * * *